United States Patent

[11] 3,542,113

[72] Inventors Alexei Alexeevich Mostofin;
Nina Sergeevna Sorokina, Leningrad, U.S.S.R.
[21] Appl. No. 736,178
[22] Filed June 11, 1968
[45] Patented Nov. 24, 1970
[73] Assignee Tsentralny nauchno-issledovatelsky i proektno-Konstruktorsky Kotloturbinny institut imeni I. I. Polzunova, Leningrad, U.S.S.R.

[54] DEVICE FOR MEASURING SALT CONCENTRATION IN SAMPLES
1 Claim, 1 Drawing Fig.
[52] U.S. Cl. ............................................. 159/30, 122/382; 324/30B; 159/44; 203/3
[51] Int. Cl. ............................................. G01n 27/42; B01d 1/02
[50] Field of Search ........................................ 60/Inq; 122/382; 73/425.4, Inq; 159/30, 1, 44; 324/30B, 62, 65LP; 23/230, 253; 203/7

[56] References Cited
UNITED STATES PATENTS

| | | | |
|---|---|---|---|
| 1,898,209 | 2/1933 | Parker ........................ | 122/382 |
| 2,017,368 | 10/1935 | Magner ...................... | 236/1 |
| 2,294,501 | 9/1942 | Junkins ...................... | 122/1 |
| 2,964,024 | 12/1960 | Kaufman et al. ............. | 122/382 |
| 3,003,103 | 10/1961 | Smals et al. ................ | 324/30B |
| 3,131,346 | 4/1964 | Parke ........................ | 324/30B |
| 3,139,071 | 6/1964 | Rivers ...................... | 122/382 |

Primary Examiner—Norman Yudkoff
Assistant Examiner—J. Sofer
Attorney—Waters, Roditi, Schwartz & Nissen

ABSTRACT: A device is provided for obtaining slat-enriched samples of condensates from power generating equipment of power plants and for measuring the salt content in the samples. The device has a succession of evaporators through which the sample passes, whereafter the sample is supplied to a sensor of the electrical conductivity of the concentrated sample, whereafter the sample passes to a final evaporator furnished with a throttle washer at the steam outlet end thereof.

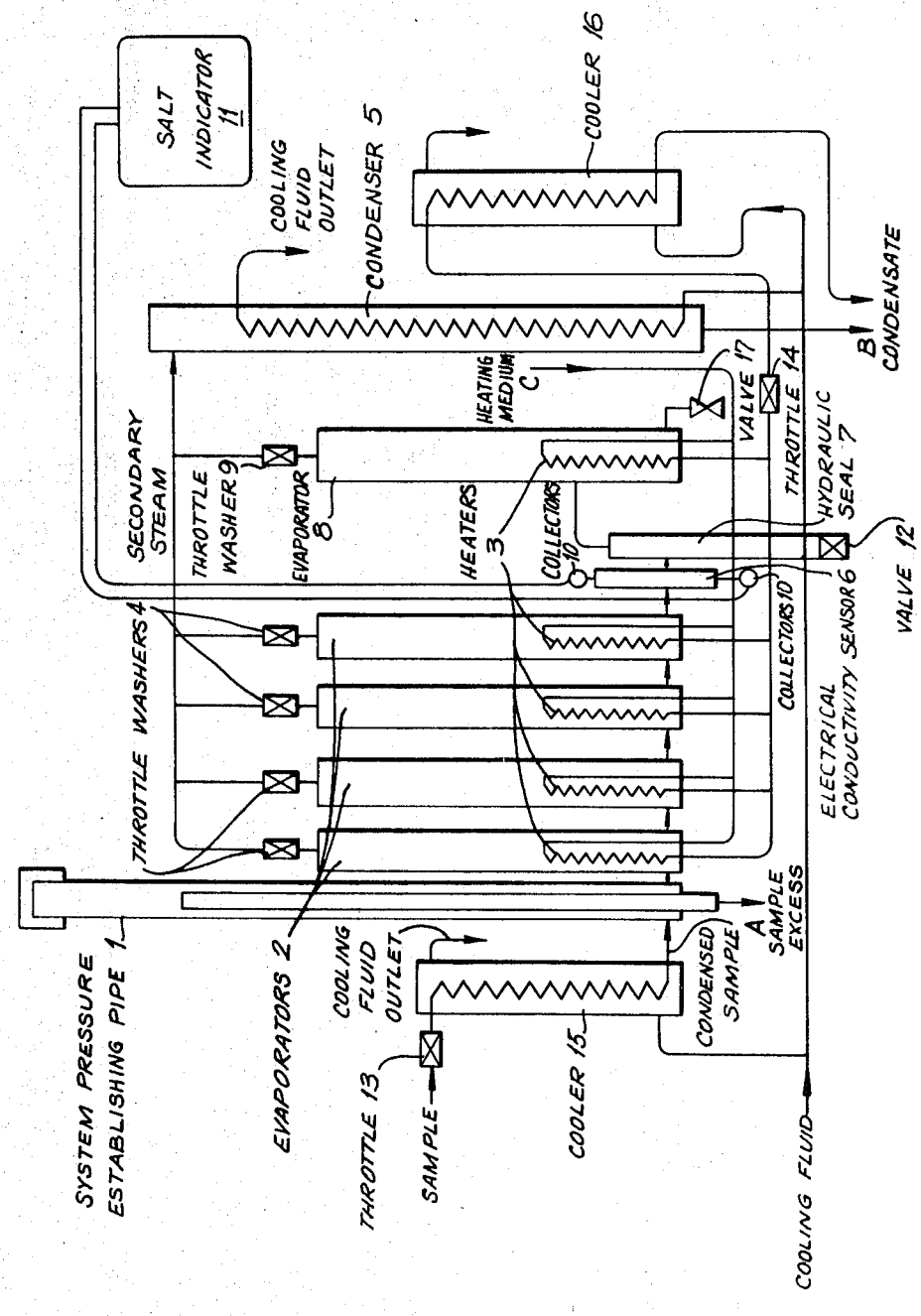

3,542,113

DEVICE FOR MEASURING SALT CONCENTRATION IN SAMPLES

The present invention relates to devices for controlling the quality of water in boiler/turbine units of power plants and, more particularly, to devices for obtaining salt-enriched samples of the condensates derived from the power-generating equipment of power plants and for measuring the low concentration of salt components in the samples taken in steam lines of power plant boiler/turbine units.

Known in the art are devices for obtaining salt-enriched samples of the condensates derived from the power-generating equipment of power plants and for determining the salt content of said samples by electric conductivity measurements, wherein the sample is directed via a header and concentrator to an electric conductivity sensor.

The known devices suffer from the disadvantages of being bulky, involving a significant consumption of the samples obtained, having an excessive response time and of providing but a low stability of salt-enriched sample consumption.

It is an object of the present invention to provide a device for obtaining salt-enriched samples of the condensates derived from the power-generating equipment of power plants and for measuring the salt content in said samples that will be noted for its moderate overall dimensions and low response time.

It is another object of the invention to provide a device for obtaining salt-enriched samples of the condensates derived from the power-generating equipment of power plants and for measuring the salt content of said samples which is characterized by its enhanced reliability and reduced operating costs.

It is a further object of the present invention to provide a device for obtaining salt-enriched samples of the condensates derived from the power-generating equipment of power plants and for measuring the salt content in said samples, which make it possible to reduce the frequency of the samples taken and of heating steam.

In accordance with these and other objects, in the device for obtaining salt-enriched samples of the condensates derived from the power-generating equipment of power plants and for measuring the salt content in said samples, provision is made, according to the invention, for connecting the concentrated sample electric conductivity sensor to an evaporator for evaporating the sample as it comes from the sensor and furnished with a throttle washer at the steam outlet end thereof.

The above-noted features of the present device render possible a reduced frequency of the samples taken and of heating steam.

Other objects and advantages of the present invention will become apparent from consideration of the description of an exemplary embodiment of the present device with reference to an accompanying drawing the sole figure of which shows a simplified diagram of the device, according to the invention.

The proposed device incorporates pressure pipe 1, which makes possible the maintenance of constant pressure in the concentrator and the discharge of sample excess. Pressure pipe 1 is connected to a concentrator consisting of four evaporators 2 connected in series. In each evaporator 2, provision is made for tubular heater 3 and throttle washer 4. All the evaporators 2 are connected to a common condenser 5, which effects the condensation of steam generated in evaporators 2 of the concentrator. Concentrate sample electric conductivity sensor 6 is furnished with two stainless steel electrodes. At the sample inlet side, the sensor is connected to the fourth evaporator 2 of the concentrator, while the sample outlet side communicates, via hydraulic seal 7, with evaporator 8, in which provision is made for throttle washer 9 disposed at the steam exit side. Evaporator 8 is designed for evaporating the concentrated sample as it leaves sensor 6, said evaporator being connected to condenser 5. Collectors 10 serve for connecting sensor 6 to salt content indicator 11 having a graduated scale. The employment of the hydraulic seal makes for dependable operation of sensor 6. Thanks to the provision of valve 12 in hydraulic seal 7, it is practicable to periodically take samples for subsequent chemical analysis.

Multistage washer-type throttle 13 is designed for limiting the consumption of sample directed to the present installation and also for reducing the pressure of the sample in question to atmospheric pressure.

Washer-type throttle 14 serves for discharging the heating steam condensate at a minimum steam escape.

Coolers 15 and 16 are intended for cooling the sample directed to the present device and also for cooling the heating steam that comes from heaters 3. To periodically purge evaporator 8, use is made of valve 17.

The present device functions in the following manner.

The condensate of power-generating equipment of power plants is sampled at a rate somewhat in excess of the requisite rate and the sample thus obtained, upon passage through multistage washer-type throttle 13 and cooler 15, arrives at the pressure pipe 1, which pressure pipe provides for pressure constancy in evaporators 2 and 3 and for the discharge of sample excess into the condensate line of the power plant (as shown by arrow A). Having passed through the pressure pipe 1, the sample, under a specified pressure and at a desired rate, passes through the series of evaporators 2, and undergoes consecutive evaporation. After the fourth evaporator 2, the sample subjected to multiple evaporation and exhaustive degassing arrives at concentrated sample electric conductivity sensor 6, and thereafter flows, via hydraulic seal 7, to the last evaporator 8 where it undergoes ultimate evaporation.

The secondary steam from each evaporator 2 and 8 passes through appropriate throttle washers 4 and 9 and comes to common atmospheric condenser 5, where it undergoes condensation and thereupon is discharged into the condensate line, as shown by arrow B.

Sample evaporation is effected in internally steam-heated heater 3, wherein the heating medium is low-pressure saturated steam fed to evaporators 2 and 8 as shown by arrow C. In evaporators 2 and 8, the heating surfaces are calculated conservatively, thereby making it possible to employ the heaters in question at different pressures of the heating steam used. The heating steam condensate that forms in heaters 3 is led off, via washer-type throttle 14, to cooler 16.

The evaporation ratio, K, of the sample passing through sensor 6 equals the ratio of the volumetric flow rate of the sample to be concentrated, G, to the output, g, in evaporator 8, viz., $$K=\frac{G}{g}=\frac{F}{f}$$

wherein F is the total flow area of all throttle washers 4 and 9, f is the flow area of throttle washer 9 of evaporator 8.

This simple dependence is observed due to the fact that the pressure gradients and state of the heating steam will be identical for all throttle washers 4 and 9.

The pressure upstream of throttle washers 4 and 9 equals the pressure produced by the pressure pipe 1, while downstream of throttle washers 4 and 9 the pressure equals that of the ambient atmosphere. Where in any one of evaporators 2 and 8 the pressure experiences a drop, there ensues an enhanced inflow of the sample to be evaporated and a concomitant increase of the intensity of heat transfer with the resultant gradual increase of the pressure and output at the evaporation stage in question until the pressure and output reach the rated values. If, for some reason, the pressure in any one of evaporators 2 and 8 rises above the preset value, there occurs a process that is opposite to the one described hereinabove.

Evaporator 8 effects the ultimate evaporation of the sample taken, so that the concentration of dissolved salts therein grows continuously as the process of evaporation proceeds and may be so high as to cause the precipitation of the salts. To prevent salt precipitation, in evaporator 8 provision is made for valve 17 intended for periodically purging the evaporator.

Performance reliability of the devices for obtaining salt-enriched samples of condensates is enhanced due to the fact that the concentrated sample from electric conductivity sensor 6 is evaporated in evaporator 8, which incorporates throttle washer 9 at the steam outlet end. All throttle washers 4 and 9, which stabilize evaporation loads in evaporators 2 and 8, are mounted on the steam lines. As the specific volume of steam is greater than that of liquid, the diameters of throttle washers 4 and 9 increase thereby diminishing the clogging of the throttle washers.

The salt content of the samples is continuously monitored by salt content recorder 11.

In order to periodically monitor the content of various components, the concentrated sample is discharged from sensor 6 by means of hydraulic seal 7 and valve 12, and thereafter subjected to chemical analysis.

The installation of the present devices on boiler/turbine units results in a substantial annual saving because of the reduced consumption of heating steam and the smaller samples used.

Although the present invention has been described with reference to the preferred embodiment thereof, it will be readily understood by those skilled in the art that various modifications and alterations may be made without deviating from the spirit and scope of the invention as disclosed in the description and appended claims.

We claim:

1. A device for obtaining salt-enriched samples of the condensates derived from the power-generating equipment of power plants and for determining the salt content of said samples by electric conductivity measurements which comprises a pressure pipe, a concentrator communicating with said pressure pipe for receiving therefrom a sample to be tested; a concentrated sample electric conductivity sensor connected to said concentrator; an evaporator coupled to said sensor for evaporating the sample received therefrom and having a steam outlet side, and a throttle washer disposed at the steam outlet side of said evaporator.